US012759696B2

(12) United States Patent
Antraygue

(10) Patent No.: US 12,759,696 B2
(45) Date of Patent: Oct. 13, 2026

(54) FLIGHT CONTROL SYSTEM

(71) Applicant: Ratier-Figeac SAS, Figeac (FR)

(72) Inventor: Cedric Antraygue, Figeac (FR)

(73) Assignee: RATIER-FIGEAC SAS (FR)

( * ) Notice: Subject to any disclaimer, the term of this patent is extended or adjusted under 35 U.S.C. 154(b) by 0 days.

(21) Appl. No.: 19/097,037

(22) Filed: Apr. 1, 2025

(65) Prior Publication Data

US 2025/0313331 A1 Oct. 9, 2025

(30) Foreign Application Priority Data

Apr. 8, 2024 (EP) .................................... 24305549

(51) Int. Cl.
*B64C 13/04* (2006.01)

(52) U.S. Cl.
CPC ................................ *B64C 13/0421* (2018.01)

(58) Field of Classification Search
CPC .............. B64C 13/0421; B64C 13/042; B64C 13/0425
See application file for complete search history.

(56) References Cited

U.S. PATENT DOCUMENTS

| | | | |
|---|---|---|---|
| 4,420,808 A | 12/1983 | Diamond et al. | |
| 8,401,860 B1 * | 3/2013 | Evans | G10L 15/22 701/16 |
| 9,718,537 B2 | 8/2017 | Scacchi et al. | |
| 10,882,631 B2 | 1/2021 | Granier et al. | |
| 11,377,200 B2 | 7/2022 | Gibson et al. | |
| 11,518,497 B2 | 12/2022 | Spiegel et al. | |
| 2009/0187292 A1 | 7/2009 | Hreha et al. | |
| 2014/0091181 A1 * | 4/2014 | Ouellette | G06F 3/0338 244/221 |
| 2018/0057147 A1 * | 3/2018 | Roop | B64C 13/042 |
| 2019/0025869 A1 | 1/2019 | Parazynski | |
| 2019/0389563 A1 * | 12/2019 | Swain | G01S 7/412 |
| 2020/0333805 A1 * | 10/2020 | English | B64C 27/54 |
| 2023/0286645 A1 | 9/2023 | Kang et al. | |
| 2023/0384817 A1 | 11/2023 | Kim et al. | |

FOREIGN PATENT DOCUMENTS

| | | |
|---|---|---|
| EP | 2707546 B1 | 3/2017 |
| JP | H06199292 A | 7/1994 |
| KR | 20230083211 A | 6/2023 |

OTHER PUBLICATIONS

European Search Report for Application No. 24305549.8, mailed Sep. 18, 2024, 9 pages.

* cited by examiner

*Primary Examiner* — Rodney A Bonnette
(74) *Attorney, Agent, or Firm* — CANTOR COLBURN LLP

(57) ABSTRACT

A flight control system for an aircraft. The aircraft has a set of principle axes including a roll axis and a pitch axis. The flight control system includes a control stick that is configured to move forwards and backwards and left and right to control movement of the aircraft about its roll and pitch axes, such movement of the control stick thus providing a first set of inputs to the flight control system. The control stick includes a further input in the form of a moveable element that can be moved between a range of positions and that is configured to provide a graduated input to the flight control system based on the position of the moveable element relative to a default position of the moveable element, the moveable element being positioned on a side or front portion of the control stick.

14 Claims, 3 Drawing Sheets

FLIGHT CONTROL SYSTEM

CROSS-REFERENCE TO RELATED APPLICATIONS

This application claims the benefit of European Patent Application No. 24305549.8 filed Apr. 8, 2024, the disclosure of which is incorporated herein by reference in its entirety.

TECHNICAL FIELD

The present technology relates to aircraft flight control systems and in particular to an improved control stick for an aircraft.

BACKGROUND

Various types of flight control systems are known to allow a pilot or crew to control, from the cockpit of an aircraft, the thrust output of the aircraft's engines and the movement of flight control surfaces such as wing flaps, slats, elevators, rudders, etc., to control rotation of the aircraft about its principal axes (i.e. the yaw (normal), pitch (lateral) and roll (longitudinal) axes of the aircraft).

FIG. 1 shows an example of a more traditional cockpit 2 in a civil airplane. The cockpit 2 includes two sides, each configured to allow a pilot (or co-pilot) to sit and control the aircraft. Each side of the cockpit 2 includes a seat 4 and various controls to allow each pilot to control different aspects of the airplane (the various controls together defining a cockpit "inceptor" system).

As shown in FIG. 1, the controls include a control stick 6 which allows the pilot to control the roll and pitch of the airplane. At the pilots' feet there are two rudder pedals 8 which provide a foot-operated flight control interface for controlling the rudder of the airplane to allow the pilots to control the yaw angle of the airplane. A thrust lever 10 is provided on a central pedestal 12 of the cockpit 2. This allows the pilot to control the thrust magnitude (i.e. total thrust) generated by the airplane engines. There is also provided a spoiler lever 14 to control braking of the airplane.

In order to control movement of the aircraft about the yaw axis (i.e., steering of the aircraft to the left or right), the pilot pushes the right or left rudder pedals 8 to a greater or lesser degree depending on the desired change of the yaw angle, where the right rudder pedal 8 causes the airplane to steer to the right, and the left rudder pedal causing the aircraft to steer to the left. In order to change the thrust magnitude of the aircraft, the pilot pushes the thrust lever 10 forward or backwards. The further forwards that the pilot pushes the thrust lever 10, the higher the total thrust generated by the airplane engines. The control stick 6 for controlling roll and pitch in this example is located on an opposite side of the pilot to the thrust lever 10, and the pilot can rotate the control stick 6 forward or backwards to change the pitch angle of the airplane and left or right to control the roll angle of the airplane.

The Applicants however believe that there remains scope for improved aircraft flight control systems.

SUMMARY

According to a first aspect of the present technology, there is provided a flight control system for an aircraft, the aircraft having a set of principle axes including a roll axis and a pitch axis. The flight control system comprises a control stick that is configured to move forwards and backwards (e.g. in a first, longitudinal direction) and left and right (e.g. in a second, lateral direction) to control movement of the aircraft about its roll and pitch axes. This movement of the control stick in this way thus provides a first set of inputs to the flight control system to control movement of the aircraft about its roll and pitch axes, e.g. in the normal manner for an aircraft control (side) stick.

The control stick according to the present technology, however, also comprises a further input in the form of a moveable element that can be moved between a range of positions and that is configured to provide a graduated input to the flight control system based on the position of the moveable element relative to a default position of the moveable element. That is, the further input to the flight control system is controlled by movement of the moveable element relative to the rest of the control stick. In particular, according to the present technology, this moveable element is positioned on a side or front portion of the control stick. As will be explained further below, the moveable element is thus advantageously configured and arranged for operation by a pilot's finger, in normal use.

For instance, the above control stick may have a central axis (e.g. extending from a bottom to a top end). The above mentioned 'front portion' of the control stick may be considered to be any portion of the control stick within a front sector of the control stick, the front sector extending about the central axis by 45 degrees either side of a forward direction. Similarly, the above mentioned 'side portion' of the control stick may be considered to be any portion of the control stick within a side sector of the control stick, the side sector extending about the central axis by 45 degrees either side of the left or right direction (the left or right direction being perpendicular to both the central axis and the forward direction).

The above moveable element, in particular its positioning, accordingly facilitates the moveable element to be controllable by a pilot's finger (the term "finger" here excluding the thumb) in normal use. Thus, when the pilot grips the control stick (e.g. by placing their palm on a side of the control stick, with their thumb towards the top of the control stick) and wraps their fingers around the control stick, the pilot can easily control the moveable element using a finger, such as their index or middle finger. This allows the pilot to provide an input by moving of the moveable element using their finger, and they can also move the whole control stick forwards/backwards and left/right at the same time. In this way, the pilot can conveniently provide at least three inputs to the flight control system using the same control stick, thereby simplifying the controls for the aircraft (because the same control stick can be used to control at least three variables). The fact that the moveable element can be moved between a range of different positions in a graduated (e.g. substantially continuous manner) allows the pilot to provide a greater lever of control of the further input than, say, a simple, binary on/off switch, and a pilot's finger is suited to providing more accurate continuous control of the moveable element.

It is noted that the forward and backwards and right and left directions defined above are generally defined relative to the aircraft. In other words, when the control stick is installed in a cockpit of the aircraft, the control stick is moveable forwards towards the front of the aircraft, backwards towards the back of the aircraft, and left and right relative to the aircraft. Thus, similarly to the normal manner for operating an aircraft control (side) stick, forwards and backwards movement of the control stick may control a pitch angle of the aircraft (i.e. movement of the aircraft about its pitch axis), and left and right movement of the control stick may control a roll angle or roll rate of the aircraft (i.e. movement of the aircraft about its roll axis). These movements are particularly intuitive for a pilot. The control stick may be moveable forwards and backwards and left and right relative to a neutral (e.g. vertical) position of the control stick, e.g., such that when the control stick is in the neutral position, no roll and pitch control is performed.

In an embodiment of any of the above, the control system is configured such that the moveable element (i.e. that provides the further input) is configured to control movement of the aircraft about its yaw axis. Here, the term "yaw axis" has its usual meaning in the context of aircraft and is another of the aircraft's principal set of flight axes (the yaw axis being generally vertical relative to the aircraft and perpendicular to both the roll and pitch axes). In such an embodiment, the moveable element may have a neutral position, and movement of the moveable element from its neutral position may cause rotation of the aircraft about its yaw axis. For example, the moveable element may be moveable either side of the neutral position, such that when the moveable element is moved to one side of the neutral position, the aircraft turns right, whereas when the moveable element is moved to the other side, the aircraft turns left.

In an embodiment of any of the above, the moveable element may be configured to control movement of the aircraft about its yaw axis during flight, and also to control steering of the aircraft when taxiing. The degree to which the moveable element is moved from the neutral position may decide how steeply the aircraft turns (both in flight or when taxiing). In embodiments where the moveable element can control the aircraft in taxiing, the control system may be configured to convert movement of the moveable element into steering of the aircraft by any suitable means, for example by causing the nosewheel of the aircraft to rotate and/or by causing differential thrust of each side of the aircraft.

Thus, in the above embodiment, the same control stick is operable both to control steering during taxiing and to control yaw during flight. In this embodiment, the moveable element that is used to control yaw during flight is also used to control steering during taxiing. Thus, in such an embodiment, when the aircraft is taxiing, movement of the moveable element may actuate rotation of a nosewheel of the aircraft to control steering of the aircraft, whereas when the aircraft is in flight, movement of the moveable element may actuate one or more flight control surfaces to control the yaw angle of the aircraft. Alternatively or additionally, movement of the moveable element during flight and/or during taxiing can cause engines on each side of the aircraft to output a differential thrust (such that one side of the engine produces a different thrust to the other side of the aircraft) in order to control yaw of the aircraft. This functionality may be employed during normal flight or, for example, if the event that the rudder (for example the rudder actuator) fails. This system allows the control stick to be used to control steering of the aircraft during taxiing, and further contributes to the simplicity of the cockpit and an improved experience for the pilot because, once again, this motion is intuitive and allows the pilot to control movement of the aircraft during taxiing using one control stick, thus further improving the simplicity of the cockpit and reducing weight of the aircraft.

In an embodiment of any of the above, the moveable element may be configured to move in a generally circumferential direction relative to a or the central axis of the control stick. In other words, the moveable element may move within a plane which is perpendicular to the central axis of the control stick. This movement allows the moveable element to be easily moved by a user's finger, and is intuitive, especially in embodiments where the moveable element is controlling yaw of the aircraft.

In an embodiment of the above, the moveable element may be configured to move forwards and backwards relative to the control stick (as above, the forwards and backwards directions defined relative to an aircraft). In this example, the moveable element may be conveniently located on the side portion of the control stick. This is easy for the pilot to access with a finger, and this movement is intuitive for the pilot, especially when controlling yaw of the aircraft (because clockwise movement of the moveable element could cause the aircraft to rotate clockwise relative to the pitch axis, and anticlockwise movement could cause the aircraft to rotate anticlockwise).

Alternatively, the moveable element may be configured to move left and right relative to the control stick (as above, left and right being defined relative to aircraft when the control stick is installed on the aircraft). In this example, the moveable element may be conveniently located on a front of the control stick, which again makes it easy for the pilot to access the moveable element with their finger. This movement is again intuitive for the pilot, especially when controlling yaw of the aircraft because essentially movement (e.g. rotation) of the moveable element to the right (e.g. relative to a neutral position) can cause the aircraft to turn right and movement to the left can cause the aircraft to turn left.

In an embodiment of any of the above, the moveable element may comprise a stick, lever, roller, or slider, that can be moved relative to the control stick to control the further input to the flight control system. These components are simple to manufacture and easy for a pilot to control using their finger, and they can be moved substantially continuously between a range of positions.

Thus, in embodiments, the moveable element may be configured to be substantially continuously moved between the range of positions. For example, the moveable element may be configured to be pivoted or rotated about a certain axis, and the moveable element may be able to substantially continuously move about that axis through a range of angles (with the range of angles in embodiments extending either side of a default, or zero angle). In embodiments, the axis about which the moveable element is pivoted/rotated may be generally parallel to a or the central axis of the control stick. This allows the moveable element to be more easily and accurately moveable by a pilot's finger, because the pilot can extend or bend their finger to move the moveable element. In embodiments, the moveable element may be able to rotate relative to the control stick through an angle of at least 30 degrees, optionally at least 60 degrees, optionally at least 90 degrees, optionally at least 110 degrees, optionally at least 130 degrees.

In an embodiment of any of the above, the control stick may extend longitudinally between a bottom end and a top end, with a or the central axis of the control stick extending longitudinally between the bottom end and top end. The bottom end of the control stick is configured to be pivotally attached to a base, and the top end is the end of the control stick furthest from the bottom end. The pivotal attachment of the control stick to the base allows the control stick to move forwards and backwards and left and right. In embodiments, the flight control system may also comprise the above base.

In an embodiment of any of the above, the control stick may have a total length extending from a bottom end to a top end, the moveable element being spaced from the top end by a distance that is at least 5%, and optionally at least 10% of the total length of the control stick. In embodiments, the moveable element is spaced from the top end by a distance that is at least 15%, 20%, 25%, or 30% of the total length of the control stick. This spacing of the moveable element from the top end allows the moveable element to be optimally located to be controlled by a user's finger in normal use, and prevents the moveable element from interfering with a top of the control stick, which may contain additional controls. In the above embodiment, the top end may be defined as the furthest point of the control stick from bottom end, and the bottom end may coincide with the point at which the control stick is attached to the base (if present).

In an embodiment of any of the above, the moveable element may be spaced from the bottom end of the control stick by a distance that is at least 40%, more preferably at least 50% of the total length of the control stick. In embodiments, the moveable element is spaced at least 55%, 60%, 65%, or 70% of the total length of the control stick from the bottom end. This allows the moveable element to be easily controlled by a pilot's index or middle finger when the pilot has placed their palm on a side of the control stick and has wrapped their fingers around the control stick, which allows the moveable element to be more accurately controlled by the pilot (because the first two fingers have a greater degree of fine motor control).

In an embodiment of any of the above, the control stick may comprise a shaft for being gripped by a pilot (the shaft optionally being generally cylindrically shaped). In such an arrangement, an or the central axis of the control stick extends longitudinally along a centre of the shaft. The control stick may also comprise a handle portion or top portion, where the top portion may be a portion of the control stick that includes the top 20% of a or the total length of the control stick. The top portion may be a thicker portion than the rest of the control stick (the thickness being perpendicular to a central axis of the control stick). In one particular embodiment, the moveable element is provided on a side of the top portion.

In a further embodiment of any of the above, the control stick may further comprise a second moveable element provided on a or the top portion (or handle portion) of the control stick. This placement of the second moveable element allows the second moveable element to be easily controlled by a pilot's thumb. The second moveable element may be continuously moveable between a range of positions in order to provide graduated control.

The second moveable element may be in the form of a thumb stick, lever or roller, for example, as these are easy for a pilot to control using their thumb. In a particular embodiment, the thumb stick is located on a top surface of the control stick (the top surface being a generally upwardly facing surface). This placement makes it particularly convenient for a pilot to control the second moveable element using their thumb.

In an embodiment of the above, the flight control system is configured such that the second moveable element controls braking of the aircraft, e.g. during flight and/or during taxiing. Braking can be carried out in any suitable manner, for example by deploying spoilers of the wings during flight, and by applying braking to the wheels during taxiing. For example, the second moveable element may have a neutral position, and the further that the pilot moves the second moveable element from the neutral position, the more braking that is applied. In a particular embodiment, the second moveable element may be configured to move either side of the neutral position (e.g. rotated left and right, or forwards and backwards), and this can be used to provide differential braking to the aircraft, both in flight and during taxiing. In this embodiment, when the second moveable element is moved in one direction relative to the neutral position, the flight control system may cause more braking on one side of the aircraft compared with another side, causing the aircraft to both brake and change directions at the same time. This movement may be intuitive for a pilot and increases the number of functions that the control stick can carry out, thereby allowing the cockpit of the aircraft to be simplified.

Thus, in embodiments the same control stick is used to control movement of the aircraft about its roll and pitch axes and is also used to provide one or more further inputs, for example, for controlling movement of the aircraft about its yaw axis and/or for controlling braking of the aircraft, and in embodiments is operable and configured to perform such (or at least such further) control operations both during flight and during taxiing operations.

The flight control system may, depending on whether the aircraft is taxiing or is in flight, cause the control stick to either control a first set of flight control operations for the aircraft when the aircraft is taxiing, or cause the control stick to control a second, different set of flight control operations for the aircraft when the aircraft is in flight. In some embodiments, the control stick may cause the control stick to control the same set of flight control operations. For example, in some embodiments when the further input is used to control movement of the aircraft about its yaw axis, this may cause simultaneous rotation of the nosewheel and the rudder. This system allows the pilot to continue using the same control stick once the aircraft has landed or before take-off without needing to change to a different control stick.

The flight control system may be configured to determine whether the aircraft is taxiing or is in flight in various manners. For example, this could be controlled manually by the pilot. Or, in embodiments, the flight control system may further comprise processing circuitry that is configured to determine whether the aircraft is taxiing or is in flight. The flight control system can then convert the control stick movement to suitable commands for controlling the desired systems depending on whether the aircraft is taxiing or is in flight.

The flight control system may in general be used for any suitable and desired aircraft (e.g. a helicopter). The present technology thus also extends to an aircraft including the flight control system of any of the above. In embodiments the aircraft may be a airplane (i.e. a fixed-wing aircraft), in particular an airliner. Thus, the airplane may comprises two wings and at least one gas turbine engine on each wing, where each gas turbine engine is rigidly fixed to (and unable to rotate/move relative to) each wing. The control system may be particularly suited for controlling an airplane (and particularly an airliner). This is at least in part because a pilot is able to easily control the pitch, roll and another variable (e.g. the yaw) of the aircraft accurately using the control stick.

In an embodiment of any of the above, the control stick may be constrained to move forwards and backwards and right and left, such that twisting movement of the control stick (for example) is prevented. In other embodiments, however, the control stick may be configured to be twisted.

The control stick may generally provide input to the flight control system to allow the pilot to control the aircraft as desired. For example, the forward/backward and side to side movement of the control stick may provide a set of primary inputs to control movement of the aircraft about its pitch and roll axes, as described above, with the moveable element providing a further input, e.g., and in embodiments, to control yaw (but in principle also operable to control over parameters, as desired). Depending on these inputs suitable commands may then be (and are) generated to control movement of the aircraft. This control may be performed directly, e.g. by commanding moving one or more flight control surfaces, or the commands may be input to a suitable electronic interface (e.g. of a 'fly by wire' system) that processes the commands and determines the appropriate control actions to be performed. Thus, the flight control system may further comprise suitable control circuitry that is operable to translate the inputs provided by the pilot using the control stick into suitable commands for controlling the aircraft. The control circuitry may be implemented (electro) mechanically or electronically, e.g. in the normal manner for aircraft flight control systems, and various arrangements would be possible in this regard as known in the art. That is, the technology described herein relates particularly to the form of the control stick and the control stick may generally be integrated into any suitable flight control system (for any aircraft) as desired.

The present technology also extends in a further aspect to a control stick for use with a flight control system or an aircraft according to any of the above. The control stick is configured to move forward and backwards and left and right to provide a first set of inputs, and comprises the moveable element configured to provide the further input, the moveable element being continuously moveable between a range of positions and being positioned on a side or front portion of the control stick.

In an embodiment of the above, the moveable element is configured to move in a generally circumferential direction relative to a central axis of the control stick. In further embodiments, the moveable element comprises a finger-operated stick, lever, roller, or slider, that can be moved (e.g. rotated) relative to the control stick to control the further input, e.g. in the same manner described above.

Thus, as will be appreciated by those skilled in the art, the control stick according to this further aspect can and in embodiments does include any one or more or all of features of the present technology described herein, as appropriate.

BRIEF DESCRIPTION OF THE DRAWINGS

Various embodiments will now be described, by way of example only, and with reference to the accompanying drawings in which.

DETAILED DESCRIPTION

Figure 1:
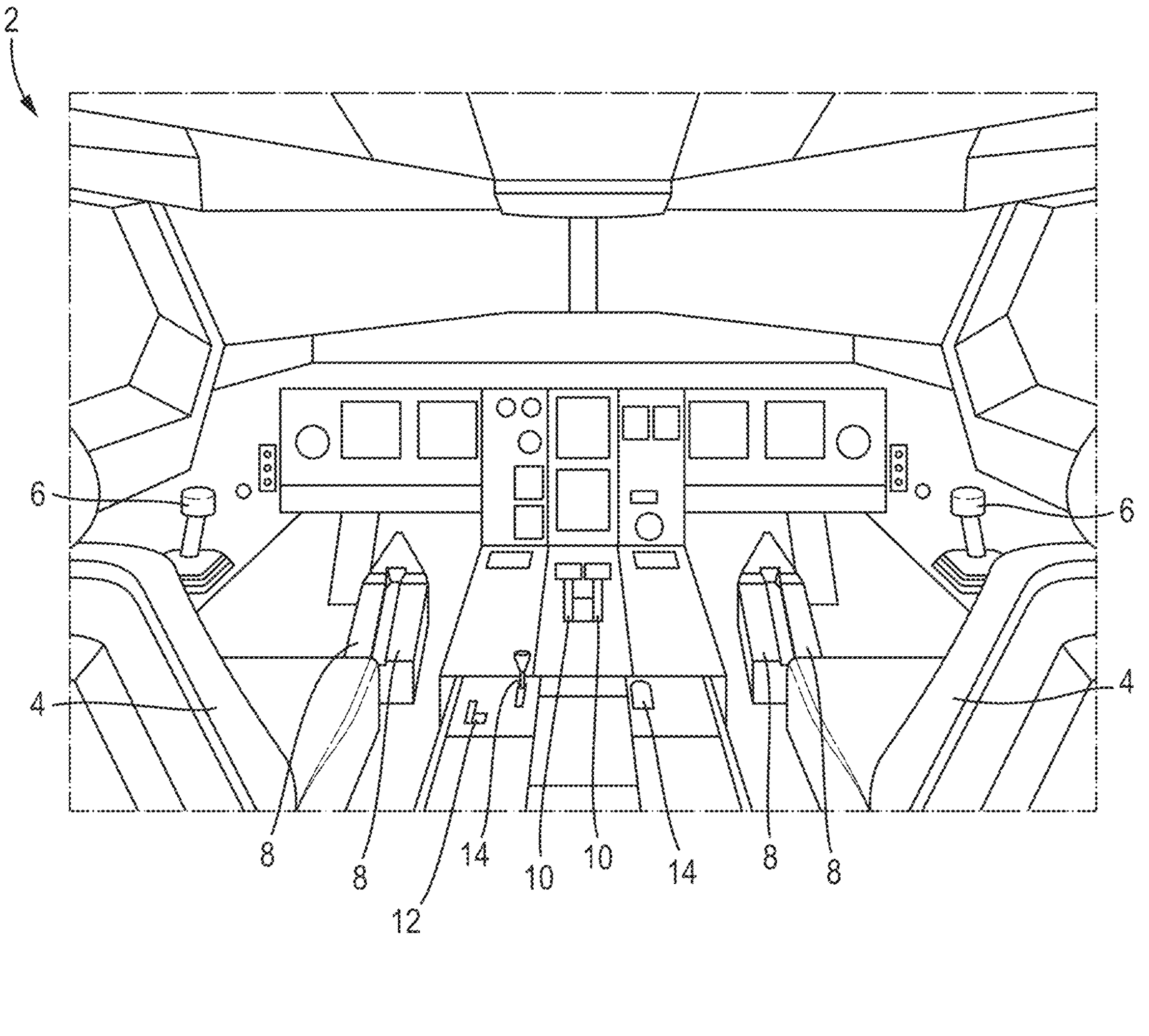
FIG. 1 shows an example of a more traditional airplane cockpit.

The present technology relates to aircraft flight control systems. FIG. 1 shows an example of a flight control system within a more traditional cockpit 2 in a civil airplane. As will be appreciated from FIG. 1, the more traditional cockpit 2 shown in FIG. 1 includes many moving parts, is relatively complicated to install and is not particularly intuitive for a pilot. Further, the rudder pedals 8 are relatively heavy and difficult to access for installation and maintenance. It is therefore desired to provide an improved flight control system.

Figure 2:
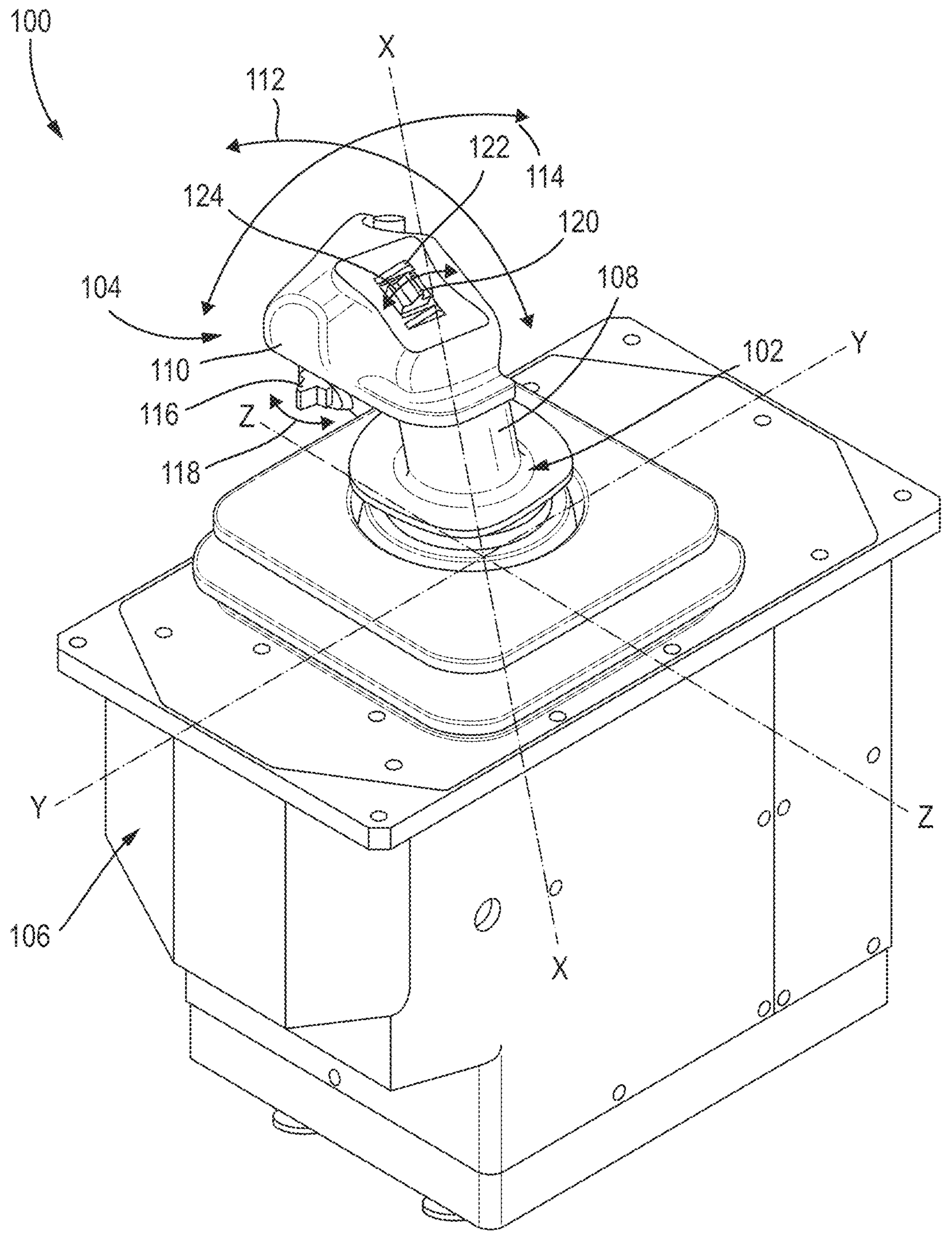
FIG. 2 shows a perspective view of an improved control stick for an aircraft, the control stick including a finger operated stick.
Figure 3:
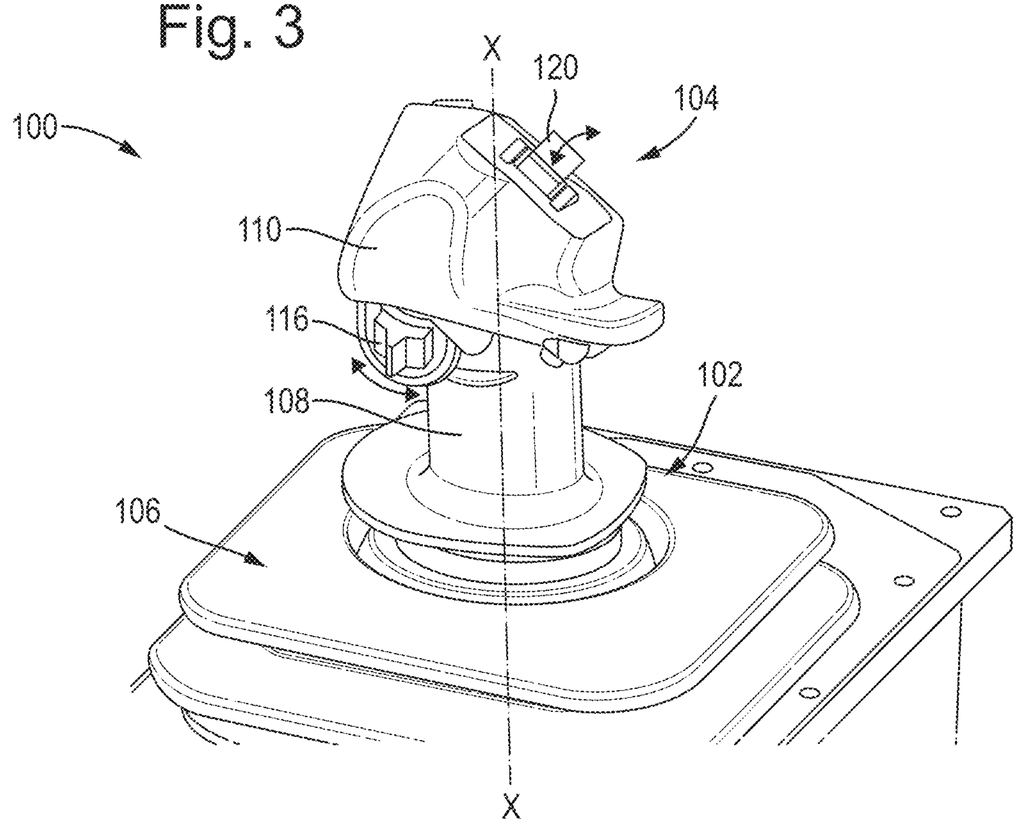
FIG. 3 shows a close-up side view of the control stick shown in FIG. 2.

FIGS. 2 and 3 illustrate an embodiment of an improved control stick 100 according to the technology described herein. The control stick 100 is a generally elongate member that extends from a bottom end 102 to a top end 104. The bottom end 102 of the control stick 100 is attached to a base 106 configured to be installed into a cockpit of an aircraft. The illustrated control stick 100 comprises a shaft 108, which has a generally cylindrical shape, and a top portion 110, the top portion 110 being wider than the shaft 108 and extending above and forward of the shaft 108. As described in more detail below, the shaft 108 is designed to be gripped by a pilot's hand, and the top portion 110 comprises features that can be controlled by a user's index finger and/or thumb.

The bottom end 102 of the control stick 100 is attached to the base 106 in such a manner that the control stick 100 can be move forward and backward along a first (longitudinal) direction 114, and left and right along a second (lateral) direction 112 as will be explained further below. The illustrated control stick 100 extends generally vertically along a central axis X when the control stick 100 is in a neutral position, where the central axis X extends along a centre of the shaft 108.

As the arrows in FIG. 2 illustrate, the attachment of the control stick 100 to the base 106 allows the control stick 100 to move forwards and backwards about a first, longitudinal axis Y which is perpendicular to the central axis X of the control stick 100. The attachment of the control stick 100 to the base 106 also allows the control stick 100 to move left and right about a second, lateral axis Z that is perpendicular to both the central axis X and the first axis Y. Movement of the control stick 100 forwards and backwards allows the pilot to control the pitch angle of the aircraft, and rotation of the control stick 100 left and right allows the pilot to control the roll angle of the aircraft. During flight, the pilot can grip the control stick 100 and move the control stick 100 about the first and second axes Y, Z simultaneously to control the roll and pitch angles of the aircraft. These movements are particularly intuitive, because the pilot is essentially moving the control stick 100 in the direction in which they would like the aircraft to rotate.

The movement of the control stick 100 along these longitudinal and lateral axes Y, Z thus provides primary inputs to the flight control system allowing the pilot to control movement of the aircraft about its roll and pitch axes.

As illustrated in FIGS. 2 and 3, the control stick 100 further comprises a secondary input to the flight control system which in this embodiment comprises a finger-operated stick 116. As explained in more detail below, in embodiments this allows the pilot to control movement of the aircraft about its yaw axis during flight. The finger operated stick 116 in this embodiment is constrained to move in a single direction, and so is essentially a lever 116 that is pivotally attached to the control stick 100 and that is designed and placed to have its position gradually adjusted by a pilot's finger. The finger operated stick 116 in this embodiment has a pivot axis 118 that is generally parallel with the central axis X of the control stick 100, such that the finger operated stick 116 can be rotated in a direction that is generally perpendicular to the central axis X. In this embodiment, the finger operated stick 116 is located on the front of the top portion 110 of the control stick 100, and this allows the finger operated stick 116 to be rotated left and right relative to the rest of the control stick 100. The illustrated control stick 100 is designed to be located on the right side of the pilot when installed in the cockpit, i.e. as a "side stick", such that in use the pilot can grip the control stick 100 with their right hand and can control the finger operated stick 116 with their right index finger. A corresponding left-handed control stick 100 may be provided for the co-pilot, which is designed so that the co-pilot can grip the control stick 100 with their left hand and can control the finger operated stick 116 with their left index finger.

When installed in an aircraft, the pilot can thus use the illustrated control stick 100 to simultaneously control movement of the aircraft about each of its principle axes (i.e. about each of the roll, pitch and yaw axes of the aircraft). In use, a pilot can grip the control stick 100 by placing their palm on control stick 100 and wrapping their fingers around the control stick 100. The pilot can then move the control stick 100 forward and backwards and left and right as described above to control the roll angle and pitch angle of the aircraft, e.g. in the normal manner for an aircraft control (side) stick. At the same time, however, the pilot can (independently) also control yaw of the aircraft using the same control stick 100 in particular by manipulating the finger operated stick 116. For example, in order to cause the aircraft to rotate anti-clockwise about its yaw axis, i.e. so that the aircraft nose turns to the left, the pilot can rotate the finger operated stick 116 anti-clockwise (or to the left) relative to its neutral position and viewed from above. This causes the aircraft to carry out the actions necessary to change the yaw angle of the aircraft to cause the aircraft to turn left, for example by adjusting the relative thrusts of the gas turbine engines on each side of the aircraft and/or by adjusting the rudder of the aircraft. The greater the angle through which the pilot rotates the finger operated stick 116 relative to its neutral position, the greater the rotation about the yaw axis. For example, if the pilot rotates the finger operated stick 116 from its neutral position left (or clockwise if viewed from above) by five degrees, this will cause the yaw angle of the aircraft to change gradually so that the aircraft turns to the right until the finger operated stick 116 is released back to the neutral position. If the pilot instead rotates the finger operated stick 116 from its neutral position to twenty degrees clockwise, for example, this will cause the yaw angle of the aircraft to change more quickly so that the aircraft turns right relatively steeply until the finger operated stick 116 is released back to the neutral position. The finger operated stick 116 may be configured to spring back to the neutral position when force is no longer applied to finger operated stick 116, or alternatively the finger operated stick 116 may be configured to stay in a particular position when it is released.

The finger operated stick 116 allows the pilot to use the control stick 100 to control yaw of the aircraft in a manner that is particularly intuitive and easy to use. The reason for this is at least because the movement of the finger operated stick 116 (in a clockwise or anti-clockwise direction relative to the central axis X) is in the same general direction as the change in yaw of the aircraft. The finger operated stick 116 can be conveniently controlled using the pilot's finger (e.g, and in particular, their index finger), which frees up the pilot's thumb for other controls, for example to control a thumb stick (as described below). Thus, the illustrated control stick 100 can be used to provide control of multiple variables. As explained above, the finger operated stick 116 can be continuously rotated between a range of angles, and as such the finger operated stick 116 can be used to provide graduated control of the yaw of the aircraft (for example to provide steeper or more gradual turning of the aircraft about the yaw axis).

The control stick 100 can be part of a flight control system comprising processing circuitry (not shown). The processing circuitry is configured to actuate the changes to the aircraft necessary to cause the desired change in the roll angle, pitch angle and yaw angle of the aircraft in response to movement of the control stick 100.

The control stick 100 illustrated has been designed to be ergonomic and easy to grip for the pilot. As mentioned above, the control stick 100 has a generally cylindrical shaft 108 which is designed to be easily gripped by a pilot. The control stick 100 also designed such that the top portion 110 is wider than the middle portion and which extends above and forward of the middle portion. The top portion 110 illustrated has a generally trapezoid cross-sectional shape and provides a top surface 122 for receiving a thumb stick 120 (described below) and side surfaces for receiving the finger operated stick 116.

As shown in FIGS. 2 and 3, the control stick 100 also comprises a thumb stick 120. The thumb stick 120 in this embodiment is provided on the top surface 122 of the top portion 110 of the control stick 100. The thumb stick 120 in this embodiment is a lever which is positioned on the control stick 100 such that it can be easily rotated by a user's thumb. The thumb stick 120 in this embodiment is configured to control braking of the aircraft during flight. In this embodiment, the thumb stick 120 is configured to be rotated forwards and backwards relative to the rest of the control stick 100, about a pivot axis 124 that is generally perpendicular to the central axis X of the control stick 100. In use, the pilot can rotate the thumb stick 120 between a range of positions in order to control braking of the aircraft. For example, if the pilot wishes to increase braking of the aircraft during aircraft descent, the pilot rotates the thumb stick 120, for example backwards. The greater the angle through which the thumb stick 120 is rotated from the neutral position of the thumb stick 120, the greater the amount of braking applied to the aircraft. In this manner the thumb stick 120 is able to provide graduated braking control during flight. Once the thumb stick 120 has been rotated from its neutral position, the aircraft flight control system will carry out the actions necessary to reduce the speed of the aircraft, for example by lifting spoilers on the wings.

Figure 4:
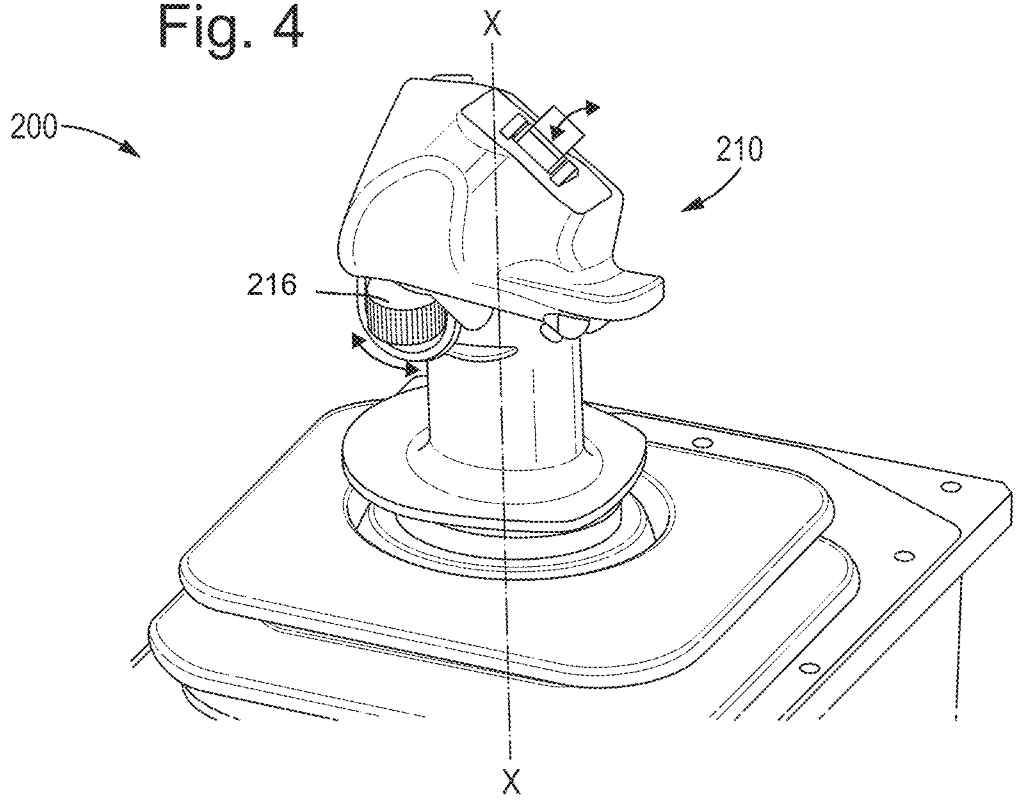
FIG. 4 shows an alternative control stick for an aircraft, the control stick including a finger operated roller.

FIG. 4 illustrates another embodiment of an improved control stick 200. The control stick 200 of FIG. 4 is similar to the control stick 100 of FIGS. 2 and 3, and has equivalent features, except that this control stick 200 has a finger operated roller 216 rather than a finger operated stick 116. The illustrated finger operated roller 216 is located on the front of the top portion 210 of the control stick 200, similarly to the finger operated stick 116 of the embodiment shown in FIGS. 2 and 3. The finger operated roller 216 is a roller placed and configured to be rotated by a pilot's finger. The finger operated roller 216 illustrated is generally cylindrically shaped and rotatable about a pivot axis, the pivot axis being generally parallel to the central axis X of the control stick 200. In this embodiment, the finger operated roller 216 can be rotated left and right in order to control yaw of the aircraft. Similarly to the finger operated lever 116, in order to cause the aircraft to turn right, the pilot can rotate the finger operated roller 216 to the right. As with the finger operated stick 116 above, the finger operated roller 216 can be moved continuously between a range of different positions, to allow the pilot to control how quickly the aircraft rotates about its yaw axis.

The control stick 100 illustrated also includes switches in the form of buttons which may control various aircraft functions, for example a PTT (push to talk) switch and/or an AP (autopilot) disconnect switch. In other embodiments these switches may be omitted.

The illustrated control stick 100 is constrained so that it can only move forwards and backwards and left and right (for example, the control stick 100 cannot be twisted).

The described finger operated stick or roller 116, 216 is able to control yaw accurately without interfering with the movements of the control stick 100 which control pitch and roll angles of the aircraft. This thus allows all of the roll, pitch and yaw angles to be controlled using one lever, without compromising on the ease-of-use and accuracy of the control stick 100. It has also been found that the presence of the thumb stick 120 to control braking does not interfere with the ease-of-use of the control stick 100, since movement of the pilot's thumb is sufficiently different to the movements required to control the roll and pitch angles, and this further simplifies the cockpit because it allows the spoiler lever to be removed.

As explained above, the described control stick 100 is particularly intuitive for a pilot to use. The control stick 100 also allows the pilot to control braking and yaw of the aircraft so that the rudder pedals and spoiler lever can be removed from the cockpit. This contributes to reducing the complexity of the aircraft controls, reduces the weight of the aircraft, and makes installation and maintenance easier. The rudder pedals are particularly heavy and difficult to install and maintain because of their relatively inaccessible location, so their removal is particularly desirable.

The described control stick 100 can also be used to control steering of the aircraft when the aircraft is taxiing. When the aircraft is taxiing, the flight control system can convert movement of the finger operated stick 116 into appropriate operations in order to control steering of the aircraft. For example, when the aircraft is taxiing, if the pilot rotates the finger operated stick 116 clockwise, the aircraft will carry out any actions necessary to turn the aircraft to the right, for example by rotating the nosewheel and/or by providing differential thrust to each side of the aircraft. This functionality further contributes to the simplicity of the cockpit and an improved experience for the pilot because, once again, this motion is intuitive. That is, the same control stick 100 can be used both during flight and during taxiing, whereas in more traditional flight control systems, a separate dedicated tiller (not shown in FIG. 1) may be provided for steering during taxiing, which tiller can therefore be removed.

In a similar fashion, the illustrated thumb stick 120 can also be used to control braking both during flight and during taxiing operations. When the aircraft is taxiing, the processing circuitry can convert movement of the thumb stick 120 into appropriate operations in order to control braking of the aircraft. For example, when the aircraft is taxiing, if the pilot rotates the thumb stick from its neutral position, the aircraft will carry out any actions necessary to brake the aircraft, for example by applying braking to the wheels.

In some examples, differential braking during taxiing can be achieved by the illustrated control stick 100 by applying simultaneous movement of the finger operated stick 116 and the thumb stick 120. For example, if the pilot wishes to simultaneously turn the aircraft to the right and reduce the speed of the aircraft during taxiing, the pilot can rotate the finger operated stick 116 right (thereby indicating to aircraft that they would like the aircraft to turn right) and rotate the thumb stick 120 from its neutral position (thereby indicating to the aircraft that they would like the aircraft to brake). Processing circuitry of the aircraft can then instruct the aircraft to provide differential braking to each side of the aircraft in order to cause the aircraft to turn and reduce its speed at the same time. In other examples, the aircraft may be configured such that in order to cause differential braking to the aircraft, the pilot can rotate the thumb stick 120 in one direction (for example to the right) to cause differential braking to cause the aircraft to turn right, and in an opposition direction (for example to the left) to cause differential braking to cause the aircraft to turn left. In yet other examples (not shown), the control stick 100 may have two thumb sticks, where one thumb stick 120 is configured to cause braking on a right side of the aircraft during taxiing and the other thumb stick 120 causes braking on a left side of the aircraft during taxiing.

Although a control stick has been described above with reference to various embodiments, it will be understood by those skilled in the art that various changes in form and detail may be made without departing from the scope of the accompanying claims.

The invention claimed is:

1. A flight control system for an aircraft, the aircraft having a set of principle axes including a roll axis and a pitch axis, the flight control system comprising:

a control stick that is configured to move forwards and backwards and left and right to control movement of the aircraft about its roll and pitch axes, such movement of the control stick thus providing a first set of inputs to the flight control system, the control stick comprising a further input in the form of a moveable element that can be moved between a range of positions and that is configured to provide a graduated input to the flight control system based on the position of the moveable element relative to a default position of the moveable element, the moveable element being positioned on a side or front portion of the control stick and configured to rotate about an axis that is parallel to a central axis of the control stick.

2. The flight control system of claim 1, wherein the further input is configured to control movement of the aircraft about its yaw axis based on the position of the moveable element.

3. The flight control system of claim 2, wherein the further input is configured to control movement of the aircraft about its yaw axis during flight and also to control steering of the aircraft when taxiing.

4. The flight control system of claim 1, wherein the moveable element comprises a finger-operated stick, finger-operated lever, finger-operated roller, or finger-operated slider, that can be moved relative to the rest of the control stick to control the further input to the flight control system.

5. The flight control system of claim 1, wherein the moveable element is configured to move forwards and backwards relative to the rest of the control stick or wherein the moveable element is configured to move left and right relative to the rest of the control stick.

6. The flight control system of claim 1, wherein the moveable element is configured to be continuously moved between the range of positions, the range of positions extending either side of the default position of the moveable element.

7. The flight control system of claim 1, wherein the control stick has a total length extending from a bottom end to a top end, the moveable element being spaced from the top end by a distance that is at least 5% of the total length of the control stick or being spaced from the bottom end of the control stick by a distance that is at least 40% of the total length of the control stick.

8. The flight control system of claim 1, wherein the control stick further comprises a second moveable element provided on an upper surface of the control stick to provide a yet further input to the flight control system.

9. The flight control system of claim 8, wherein the flight control system is configured such that the second moveable element controls braking of the aircraft.

10. The flight control system of claim 1, wherein the control stick is constrained to move forwards and backwards and right and left such that twisting movement of the control stick is prevented.

11. A control stick for use with the flight control system for an aircraft, the aircraft having a set of principle axes including a roll axis and a pitch axis, wherein the control stick is configured to move forward and backwards and left and right to provide a first set of inputs, the control stick comprising:

a moveable element configured to provide a further input, the moveable element being continuously moveable between a range of positions, the moveable element being positioned on a side of the control stick and configured to rotate about an axis that is parallel to a central axis of the control stick.

12. The control stick of claim 11, wherein the moveable element is configured to move in a circumferential direction relative to a central axis of the control stick.

13. The control stick of claim 11, wherein the moveable element comprises a finger-operated stick, finger-operated lever, finger-operated roller, or finger-operated slider, that can be moved relative to the control stick to control the further input.

14. The control stick of claim 11, wherein the control stick further comprises a second moveable element provided on an upper surface of the control stick to provide a yet further input.

* * * * *